(12) United States Patent
Kozasa et al.

(10) Patent No.: US 8,176,792 B2
(45) Date of Patent: May 15, 2012

(54) INSPECTION SYSTEM AND INSPECTING METHOD

(75) Inventors: Nobuhiro Kozasa, Tochigi (JP); Takafumi Ikeda, Tochigi (JP); Michio Kamiyama, Tochigi (JP); Hitoshi Yoshimichi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 12/387,055

(22) Filed: Apr. 27, 2009

(65) Prior Publication Data

US 2009/0301235 A1 Dec. 10, 2009

(30) Foreign Application Priority Data

Jun. 4, 2008 (JP) .................................. 2008-146566

(51) Int. Cl.
*G01N 3/14* (2006.01)
(52) U.S. Cl. .......................................... 73/840; 73/849
(58) Field of Classification Search .................... 73/800, 73/849
See application file for complete search history.

(56) References Cited

U.S. PATENT DOCUMENTS

| 5,380,978 A | * | 1/1995 | Pryor | ........................ 219/121.64 |
| 6,062,079 A | * | 5/2000 | Stewart | ............................ 73/488 |
| 7,024,032 B2 | * | 4/2006 | Kidd et al. | ..................... 382/141 |

FOREIGN PATENT DOCUMENTS

| DE | 42 14 863 A1 | 11/1993 |
| DE | 103 47 554 A1 | 5/2005 |
| JP | 2006-153805 A | 6/2006 |
| WO | 2007/003375 A1 | 1/2007 |

* cited by examiner

*Primary Examiner* — Hezron E Williams
*Assistant Examiner* — Paul West
(74) *Attorney, Agent, or Firm* — Carrier Blackman & Associates, P.C.; Joseph P. Carrier; William D. Blackman

(57) ABSTRACT

An inspection system for inspecting a processing accuracy of a work piece is provided. The inspection system includes a supporting mechanism which supports the work piece in a same posture as a posture in which the work piece is assembled to a body; a load reproduction device which applies a load to the work piece along a substantially vertical direction; and a measurement device which measures positions of at least one characteristic portion of the work piece while the load is being applied to the work piece.

7 Claims, 2 Drawing Sheets

INSPECTION SYSTEM AND INSPECTING METHOD

FIELD OF THE INVENTION

The present disclosure relates to inspecting products to ensure processing accuracy and, more particularly, to an inspection system and an inspecting method for inspecting the processing accuracy of a vehicle door panel.

DESCRIPTION OF RELATED ART

In a vehicle manufacturing process, a door assembly is assembled using a separate process from the assembly of the rest of the vehicle body. After the door assembly is assembled, the door assembly is then attached to a given position on the vehicle body.

In the process of assembling the door assembly, an outer panel and an inner panel are assembled first to form a door panel of a rectangular shape, and a processing accuracy of the door panel is inspected to determine whether or not the door panel is defective or non-defective. Next, if the door panel is determined to be non-defective, a plurality of parts, such as a door glass, a speaker, a garnish and an electrical unit for sliding the door glass, etc., are attached to the door panel, thereby forming the door assembly.

The door assembly thus assembled is attached to the vehicle body so as to be opened and closed freely in a manner that one end side of the door panel is supported in a cantilever manner by a plurality of hinges. Thus, in a state of an actual vehicle where the door assembly is attached to the vehicle body, the door panel is deformed since a load acts on the door panel due to a weight of the plurality of parts of the door assembly. Accordingly, at the time of assembling and inspecting the processing accuracy of the door panel, it is advantageous to take the deformation due to the load into consideration.

Thus, for example, Japanese Patent Publication Application No. JP-A-2006-153805 describes a related art inspection system in which a door panel is set at an inspection gauge, and the door panel thus set is checked by a plurality of sensors to thereby inspect the processing accuracy of the door panel. More specifically, according to the related-art inspection system, the door panel is set first in a stood-up state to the inspection gauge which supports the door panel from a lower end side and a side surface of the door panel. Then, the processing accuracy of the door panel is inspected in a manner that a reference position and a shape of the door panel are measured by the plurality of sensors, and a computer calculates a gap and positional difference between the door panel and the vehicle body based on the reference position and the shape thus measured.

However, according to the related-art inspection system, the processing accuracy of the door panel is inspected based on sensing results of the door panel in a state that differs to a large extent from a state in which the door panel is provided on a vehicle. Thus, in the related art inspection system, an amount of deformation of the door panel that will be caused when the door panel is assembled into the door assembly and attached to the actual vehicle is estimated based on experience and experimentation, that is, the loading caused when the plurality of parts are attached to the door panel to form the door assembly and the door assembly is supported in the cantilever manner is estimated. However, such an estimation is very difficult to make, and thus, a quality of the door assembly may degrade.

SUMMARY OF INVENTION

Illustrative aspects of the present invention provide an inspection system and an inspecting method which can adequately inspect a work piece such as a door panel.

According to an illustrative aspect of the invention, an inspection system for inspecting a processing accuracy of a work piece is provided. The inspection system comprises a supporting mechanism which supports the work piece in a same posture as a posture in which the work piece is assembled to a body; a load reproduction device which applies a load to the work piece along a substantially vertical direction; and a measurement device which measures positions of at least one characteristic portion of the work piece while the load is being applied to the work piece.

DETAILED DESCRIPTION OF EXEMPLARY EMBODIMENTS

An exemplary embodiment according to the invention will be explained.

Figure 1:
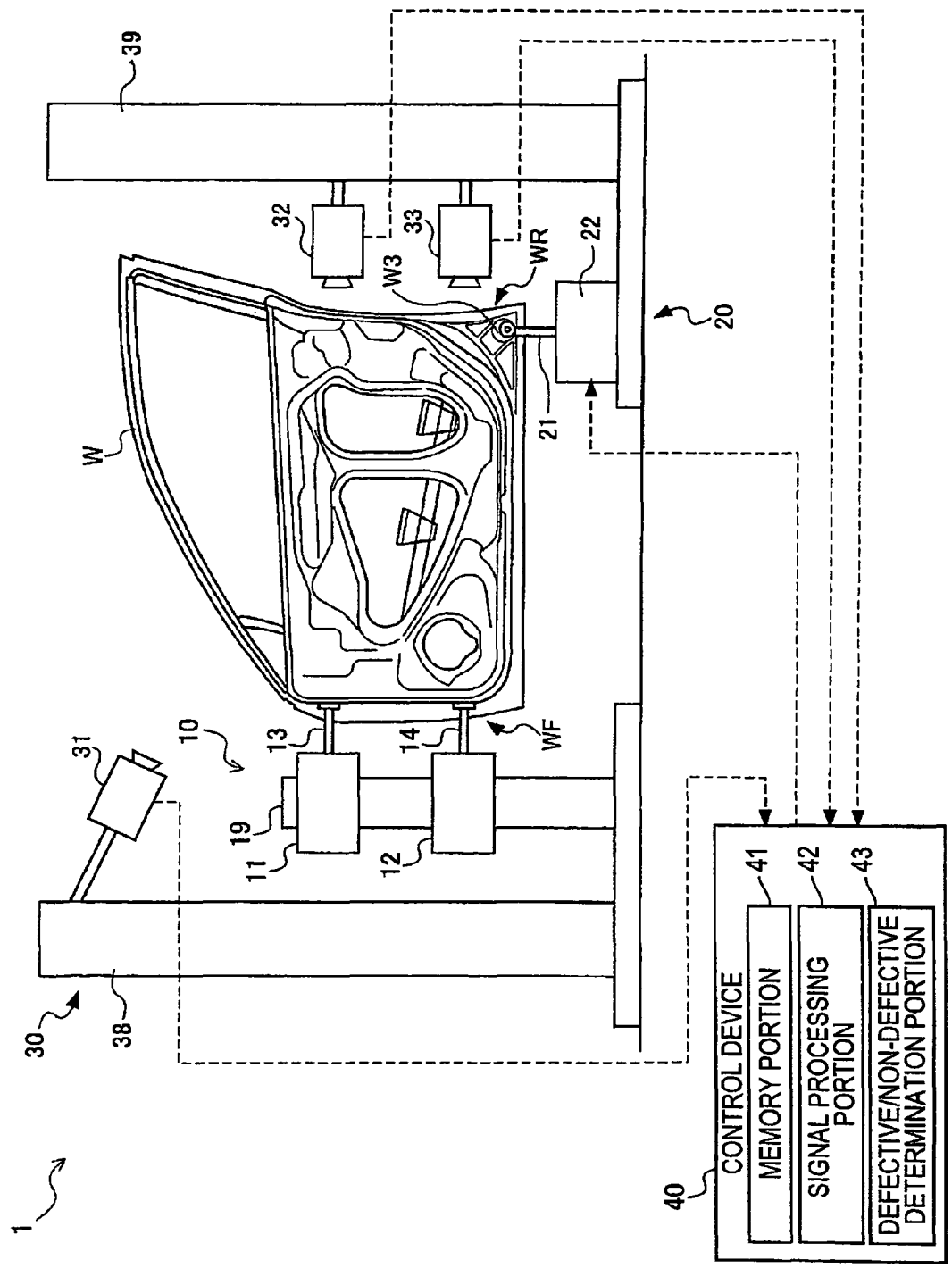
FIG. 1 is a schematic diagram showing an inspection system according to an exemplary embodiment of the invention.

FIG. 1 is a schematic diagram showing an inspection system according to the exemplary embodiment.

The inspection system 1 is provided in a manufacturing factory of vehicles, such as automobiles, and inspects a processing accuracy of a work piece that is a part of a vehicle which is a subject to be inspected.

According to the exemplary embodiment, a door panel W of a vehicle configured by laminating an outer panel and an inner panel is set as a work piece to be inspected by the inspection system 1. That is, after the inspection system 1 inspects the processing accuracy of the door panel W, a plurality of parts, such as a door glass, a speaker, a garnish, an electrical unit for sliding the door glass, etc., are attached to the door panel W to form a door assembly. The door assembly thus manufactured is attached to a body of the vehicle so as to be opened and closed freely in a manner that a front end portion WF of the door panel W is supported in a cantilever manner.

The inspection system 1 includes a supporting mechanism 10, a load reproduction device 20 serving as a load reproduction means, a measurement device 30 serving as a measurement means and a control device 40 for controlling the supporting mechanism 10, the load reproduction device 20 and the measurement device 30.

The supporting mechanism 10 includes a pillar 19 fixed on a floor surface, a first panel supporting device 11 and a second panel supporting device 12 each provided at the pillar 19. The supporting mechanism 10 supports the door panel W in a same posture as the door panel W will be placed in when the door panel W is attached to the vehicle body.

The first panel supporting device 11 and the second panel supporting device 12 respectively include a first panel supporting jig 13 and a second panel supporting jig 14 each of which has a rod shape and supports the front end portion WF of the door panel W. The first panel supporting device 11 and the second panel supporting device 12 respectively move the panel supporting jigs 13, 14 with respect to the pillar 19 to support the front end portion WF of the door panel W in a given posture.

Figure 2:
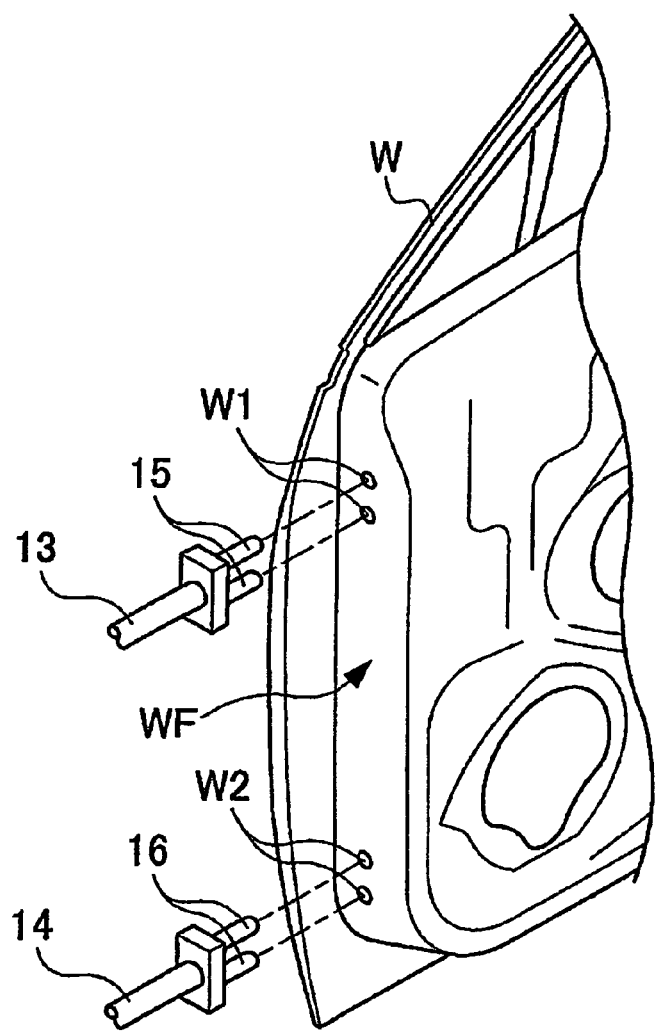
FIG. 2 is a perspective view showing a front end portion of a door panel according to the exemplary embodiment.

FIG. 2 is a perspective view showing the front end portion WF of the door panel W.

FIG. 2 shows an example of the manner in which the panel supporting jigs 13, 14 are attached to the door panel W. For example, the front end portion WF of the door panel W is formed in a flat shape and includes a pair of first hinge attachment holes W1 and a pair of second hinge attachment holes W2 in which two hinge brackets (not shown) are fixed using bolts, respectively. Alternatively, one first hinge attachment hole and one second hinge attachment hole, or a plurality of first hinge attachment holes and a plurality of second hinge attachment holes may be provided. The door panel W is assembled to the body via the hinge brackets attached to the hinge attachment holes W1, W2.

Supporting pins 15 are formed at a tip end side of the first panel supporting jig 13 and supporting pins 16 are formed at a tip end side of the second panel supporting jig 14. The supporting pins 15, 16 are respectively inserted into the hinge attachment holes W1, W2, whereby the door panel W is supported by the front end portion WF.

Returning to FIG. 1, the load reproduction device 20 includes a hook 21 having a rod-like shape, and a hook driving device 22 for applying a load to the hook 21 along a substantially vertical direction.

A tip end side of the hook 21 is engaged and locked within a hook engagement hole W3 formed at a lower end side of a rear end portion WR of the door panel W.

The hook driving device 22 applies the load to the hook engagement hole W3 of the door panel W which is being supported by the support mechanism 10 via the hook 21 such that the load occurs along the substantially vertical direction to the door panel W. The hook driving device 22 is connected to the control device 40 and operates in accordance with a control signal transmitted from the control device 40.

The measurement device 30 includes a plurality of pillars 38, 39 fixed on the floor surface in a vicinity of the door panel W and a plurality of positional sensors 31, 32, 33 provided at the pillars 38, 39. The measurement device 30 measures positions of a plurality of characteristic portions of the door panel W. The characteristic portions of the door panel W denote target portions for inspecting the processing accuracy of the door panel W.

Each of the positional sensors 31, 32, 33 includes a camera and a laser distance sensor. The camera detects the position of the characteristic portion formed on the door panel W. The laser distance sensor irradiates a laser beam toward the door panel W and detects a reflection beam from the door panel W to thereby measure a distance between a laser light source and the characteristic portion. In this manner, the positional sensors 31, 32, 33 respectively detect the positions of the characteristic portions within a three-dimensional space formed at the door panel W. The positional sensors 31, 32, 33 are connected to the control device 40 and transmit detection signals relating to the positions of the respective characteristic portions to the control device 40.

The control device 40 includes hardwares such as a display device, an input device, a central processing unit (CPU), a read only memory (ROM), a random access memory (RAM), a hard disc drive, etc. FIG. 1 shows only a memory portion 41, a signal processing portion 42 and a defective/non-defective determination portion 43 as functional blocks which are implemented as hardware.

The memory portion 41 stores, for each type of vehicle, data relating to a load acting on the door panel W of the door assembly at the time at which the door assembly is attached to the vehicle body as described above.

The signal processing portion 42, based on the data related to the load acting on the door panel W, calculates a suitable load to be applied to the hook 21 in order to reproduce the load by the load reproduction device 20, and transmits a control signal according to the load thus calculated to the driving portion 22.

The defective/non-defective determination portion 43 processes the detection signals relating to the positions of the respective characteristic portions of the door panel W transmitted from the positional sensors 31, 32, 33 of the measurement device 30, and determines whether the door panel assembly is either defective or acceptable (i.e., non-defective) based on the processing accuracy of the door panel W. More specifically, the defective/non-defective determination portion 43 compares the detected positions of the respective characteristic portions of the door panel W with the positions of the respective characteristic portions of the door panel W having been determined as non-defective in advance based on the detection signals transmitted from the positional sensors 31, 32, 33, and determines whether the door panel W is defective or non-defective based on the comparison result.

The explanation will be made as to a procedure for inspecting the door panel W according to the inspection system 1 configured in the aforesaid manner.

First, the panel supporting devices 11, 12 of the supporting mechanism 10 support the door panel W in the same posture as the posture in which the door panel W will be in when the door panel is assembled into the door assembly and is attached to the vehicle body.

Next, the hook 21 of the load reproduction device 20 is engaged and locked within the hook engagement hole W3 of the door panel W and a load is applied to the hook 21 along a substantially vertical direction.

Then, the positional sensors 31, 32, 33 of the measurement device 30 measure the positions of the respective characteristic portions of the door panel W in a state that the door panel W is applied with the load by the load reproduction device 20.

Then, it is determined whether the door panel W is defective or non-defective based on the positions of the respective characteristic portions measured by the measurement device 30.

The following actions and effects are obtained according to the exemplary embodiment.

The positions of the plurality of characteristic portions of the door assembly are measured in a state that the door panel W is supported in the same posture as the posture the door panel assembly will be in when the door panel assembly is attached to the vehicle body, and the load is applied to the door panel W along the vertical direction when the door panel W is thus supported. In this case, since the door panel W is applied with a load which is determined in view of the weights (i.e., the load) of the plurality of parts attached to the door panel W at the time the door assembly is assembled, the positions of the characteristic portions can be measured in a state that the door panel W is applied with a load that is substantially similar to an actual load which will act on the door panel W at the time the door panel assembly is attached to the vehicle body. That is, since the positions of the characteristic portions are measured in the state that the load, which is substantially the same as the actual load, is applied to the door panel W, the inspection can be made without estimating the deformation of the door panel W to be caused at the time of attaching the door panel W to the body. Thus, the inspection accuracy of the inspection system 1 can be improved.

The invention is not limited to the aforesaid exemplary embodiment and also includes various modifications and improvements thereof.

Although the aforesaid exemplary embodiment uses the door panel W as a work piece to be inspected by the inspection system 1, the invention is not limited thereto. That is, the work piece to be inspected is not limited to the door panel, and other work pieces that deform or otherwise change from the time of component assembly until assembly into a completed device may be employed.

In the aforesaid exemplary embodiment, although the load reproduction device 20 applies a load to the hook engagement hole W3 formed at the lower end side of the rear end portion WR of the door panel W, the position and the number of the positions to which a load is applied from the load reproduction device 20 are not limited thereto. That is, when the number of the positions to which a load is applied is increased, a load similar to a load which is actually applied in the case of attaching the door panel to the body as the door assembly can be applied, so that the inspection accuracy of the inspection system can be improved.

While the present inventive concept has been shown and described with reference to certain exemplary embodiments thereof, it will be understood by those skilled in the art that various changes in form and details may be made therein without departing from the spirit and scope of the invention as defined by the appended claims.

What is claimed is:

1. An inspection system for inspecting a processing accuracy of a work piece, the inspection system comprising:
   a supporting mechanism which supports the work piece in a same posture as a posture in which the work piece is assembled to a body;
   a load reproduction device which applies a load to the work piece along a substantially vertical direction; wherein the load is substantially equivalent to an actual load of at least one additional component which is added to the work piece during final assembly;
   a measurement device which measures positions of at least one characteristic portion of the work piece while the load is being applied to the work piece; and
   a defective/non-defective determination unit operable to determine whether the work piece is defective based on measured positions of said at least one characteristic portion of the work piece.

2. The inspection system according to claim 1, wherein said defective/non-defective determination unit is operable to compare measured positions of said at least one characteristic portion of the work piece with corresponding pre-set positions of non-defective work piece, and to determine whether said work piece is defective based on the comparison results.

3. An inspection system for inspecting a processing accuracy of a vehicle door prior to final assembly of the vehicle door with a vehicle body, the inspection system comprising:
   a supporting device which supports the vehicle door in a same posture as a posture of the vehicle door after final assembly of the vehicle door with the vehicle body;
   a load reproduction device which applies a load to the vehicle door along a substantially vertical direction, the load being equivalent to an actual load the vehicle door will experience after final assembly with the vehicle body; wherein the actual load includes a load of at least one additional component which is added to the vehicle door during final assembly;
   a measurement device which measures positions of at least one characteristic portion of the vehicle door while the load is being applied to the vehicle door; and
   a defective/non-defective determination unit operable to determine whether the vehicle door is defective based on measured positions of said at least one characteristic portion of the vehicle door.

4. An inspection system for inspecting a processing accuracy of a vehicle door prior to final assembly of the vehicle door with a vehicle body, the inspection system comprising:
   a supporting mechanism which supports the vehicle door in a same posture as a posture of the vehicle door after final assembly of the vehicle door with the vehicle body;
   a load reproduction device which applies a load to the vehicle door along a substantially vertical direction, the load being equivalent to an actual load the vehicle door will experience after final assembly with the vehicle body;
   a measurement device which measures positions of at least one characteristic portion of the vehicle door while the load is being applied to the vehicle door; and
   a defective/non-defective determination unit operable to determine whether the vehicle door is defective based on measured positions of said at least one characteristic portion of the vehicle door;
   wherein:
   the supporting mechanism comprises a first pillar fixed to a floor surface, a first panel supporting device attached to the first pillar and comprising a first jig which is removeably attachable to the vehicle door, and a second panel supporting device attached to the first pillar and comprising a second jig which is removeably attachable to the vehicle door;
   the load reproduction device comprises a hook connected to a hook driving device, the hook being removeably attachable to the vehicle door; and
   the measurement device comprises a second pillar and third pillar fixed on the floor surface, and a plurality of positional sensors provided on the second and third pillars which sense the positions of the at least one characteristic portion.

5. The inspection system according to claim 4, further comprising:
   a control device coupled to the positional sensors, wherein the control device determines whether the vehicle door is defective based on the positions of the at least one characteristic portion.

6. An inspecting method for inspecting processing accuracy of a work piece, the inspecting method comprising:
   supporting the work piece in a same posture as a posture of the work piece after final assembly to a body;
   applying a load to the work piece along a substantially vertical direction, the load being substantially equal to an actual load on the work piece after the work piece is final assembled to the body; wherein the actual load includes a load of at least one additional component which is added to the work piece during final assembly;
   measuring positions of at least one characteristic portion of the work piece while the load is being applied to the work piece; and
   determining whether the work piece is defective based on measured positions of said at least one characteristic portion of the work piece.

7. The inspecting method according to claim 6, further comprising:
   adding said at least one additional component to the work piece; and
   assembling the work piece to the body.

* * * * *